United States Patent
Wada

(10) Patent No.: US 6,671,102 B2
(45) Date of Patent: Dec. 30, 2003

(54) PROJECTION OPTICAL SYSTEM, PROJECTION TYPE IMAGE DISPLAY APPARATUS, AND IMAGE PROJECTION SYSTEM

(75) Inventor: Ken Wada, Tochigi (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 10/284,793

(22) Filed: Oct. 31, 2002

(65) Prior Publication Data

US 2003/0128438 A1 Jul. 10, 2003

(30) Foreign Application Priority Data

Nov. 5, 2001 (JP) .......................................... 2001-339740
Oct. 22, 2002 (JP) .......................................... 2002-306608

(51) Int. Cl.$^7$ ................................................. G02B 3/00
(52) U.S. Cl. ........................................ 359/649; 359/749
(58) Field of Search ............................ 359/649, 749–755

(56) References Cited

U.S. PATENT DOCUMENTS 5,218,480 A * 6/1993 Moskovich ................. 359/749

2002/0005994 A1 * 1/2002 Shikama ..................... 359/749

FOREIGN PATENT DOCUMENTS

JP 7-35974 2/1995

* cited by examiner

Primary Examiner—Loha Ben
Assistant Examiner—M. Hasan
(74) Attorney, Agent, or Firm—Morgan & Finnegan, LLP

(57) ABSTRACT

A projection optical system which sufficiently corrects variations in aberrations during focusing irrespective of a distance at which an object is located, i.e. whether the object is located at a point of infinity or at a short distance, while maintaining advantages of a rear focus retrofocus type optical system, is disclosed. This projection optical system has, in order from the enlarging side, a first lens unit having negative optical power, and a second lens unit having positive optical power and moves in a direction of an optical axis for focusing. The following condition is satisfied: $0 \leq |f/t1| < 0.2$ where reference character t1 denotes a distance from the reducing-side conjugate plane to a pupil and reference character f denotes a focal length of the entire system.

13 Claims, 8 Drawing Sheets

PROJECTION OPTICAL SYSTEM, PROJECTION TYPE IMAGE DISPLAY APPARATUS, AND IMAGE PROJECTION SYSTEM

BACKGROUND OF THE INVENTION

1. Field of the Invention

The present invention relates to a projection optical system for use in a projection type image display apparatus that enlarges and projects an image at a finite distance.

2. Description of the Related Art

Among the projection optical systems such as the one described above, a retrofocus type lens having a lens unit with negative optical power arranged before the other lenses is characterized by covering a relatively large angle of view and by easily ensuring a long back focus as compared with the focal length.

On the other hand, since the lens system itself is asymmetric, it is difficult to correct distortion, astigmatism, or comma aberration. In particular, the optical system must be made long enough to allow distortion and astigmatism to be appropriately corrected.

Some of such retrofocus type lenses which are used for film cameras employ a rear focus type that moves a rear lens unit in the lens system for focusing. One of such retrofocus type lenses is proposed in, for example, Japanese Patent Laid-Open No. 7-35974 or the like.

In general, the rear focus type requires a focusing lens unit to be moved by only a small amount as compared with an entire focus method, which requires the entire lens system to be moved. The focusing lens unit of the rear focus type is small and light as compared with the entire focus method. Consequently, the rear focus type enables focusing to be achieved with only small driving force and is thus particularly suitable for cameras having an automatic focus detecting device for a film camera, or the like. Furthermore, the length of the lens remains constant in spite of focusing. Thus, the rear focus type has advantages such as the capability of allowing an image-taking apparatus to be held easily to prevent camera shake.

On the other hand, in connection with applications of a projection type image display apparatus using an image forming element such as a liquid crystal panel, it is desirable to develop, in order to accommodate various projection conditions, a wide-angle projection lens that can project a large image at a short projection distance so that the image appears bright from the center to corners of the image.

Further, a so-called telecentric system, which has an apparent pupil position at a point of infinity, is desired in order to eliminate the effects of light distribution characteristics of a liquid crystal (in the case of a projection type image display apparatus using a liquid crystal display panel) and the effects of the dependence of a color combining dichroic film on angle during combination of lights of a plurality of colors and to sufficiently match with the illuminating system to ensure a sufficient luminance in the peripheral portion of a projected image.

However, the conventional rear focus lens has a short distance between a reducing-side conjugate plane and a pupil, resulting in inadequate alignment of the pupil with the illuminating system. This reduces the quantity of light in the peripheral portion of the projected image and makes luminance nonuniform. Therefore, this rear focus lens is insufficient as a projection optical system for a projection type image display apparatus.

Additionally, the optical power of the first negative lens unit must be increased in order to realize a compact wide-angle lens while ensuring a specified back focus (a reduction in projection distance). In this case, the asymmetry of the optical power arrangement increases to enhance the level of outgoing comma aberration during short-distance focusing. The level of astigmatism also increases, thereby significantly degrading optical performance.

Further, another focusing method is a so-called floating type that carries out focusing by moving the first lens unit with negative optical power and the second lens unit with positive optical power at different speeds. This method reduces variations in various aberrations during focusing. However, this method involves a complicated body tube structure and thus an excessively large lens diameter. Therefore, this method tends to increase the size of the body tube as well as costs.

SUMMARY OF THE INVENTION

It is an object of the present invention to provide a projection optical system that exhibits high optical performance by appropriately correcting variations in aberrations during focusing irrespective of the distance at which an object is located, i.e. whether the object is located at a point of infinity or at a short distance, while maintaining the advantages of the rear focus retrofocus type.

To attain this object, a projection optical system according to the present invention, which enlarges and projects an image comprises in order from the enlarging side:

a first lens unit having negative optical power; and a second lens unit having positive optical power, said second lens unit moves in a direction of an optical axis for focusing.

The optical power is the inverse of a focal length.

Further, the following condition is satisfied:

$$0 \leq |f/t1| < 0.2$$

where reference character t1 denotes a distance from the reducing-side conjugate plane to a pupil, and reference character f denotes a focal length of the entire system.

A detailed configuration of the projection optical system, projection type image display apparatus, and image projection system of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.
(Embodiment 1)

Figure 1:
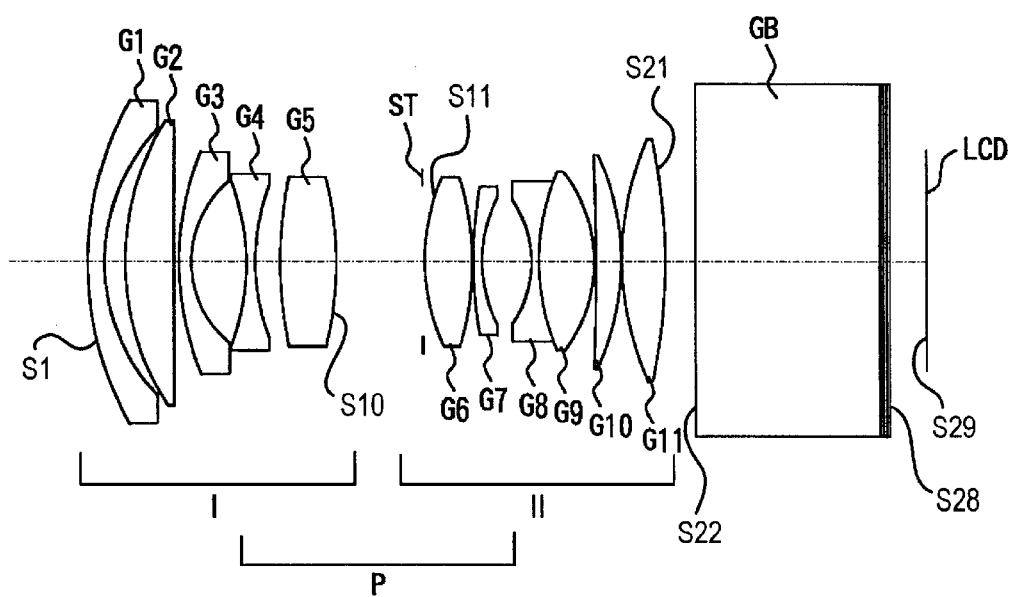
FIG. 1 is a sectional view of a projection type image display apparatus comprising a projection lens according to Embodiment 1 of the present invention.

FIG. 1 shows an optical configuration of a projection type image display apparatus according to Embodiment 1 of the present invention.

In this embodiment, reference character LCD denotes a liquid crystal display element as an image forming element which is driven on the basis of image signals from an image information supply apparatus (not shown) such as a personal computer, a VCR or a DVD player. Although not shown, one liquid crystal display element is provided for each of the red, green, and blue lights obtained by using a color separating optical system (illuminating system) to separate light from a white light source.

Further, reference character GB denotes a color combining dichroic prism which combines the color lights modified by the three liquid crystal display elements and which guides the combined light to a projection lens (projection optical system) P. Further, reference character ST denotes an aperture stop.

The projection lens P is composed of the first lens unit (hereinafter referred to as the "first negative lens unit") I having negative optical power (the inverse of a focal length) and the second lens unit (hereinafter referred to as the "second positive lens unit") II having positive optical power, the first and second lens units being arranged in this order from the enlarging side (emitting side: left end of FIG. 1) of the projection lens P.

The first negative lens unit I is composed of five lenses G1 to G5, while the second positive lens unit II is composed of six lenses G6 to G11.

Further, in this embodiment, the focus is adjusted by moving the second lens unit II in the direction of the optical axis of the projection lens P.

The first lens unit I is designed so that a concave meniscus lens is arranged closest to the enlarging side. Thereby, a large-aperture lens which covers a wide angle based on a projection ratio of 1.5:1 (projection distance: screen breadth) and which has an F of 1.5 is realized, while the first lens unit I has smaller diameter.

Further, the first lens unit I includes the three concave lenses G1, G3, and G4 to gently bend off-axial rays, thereby preventing off-axial aberration. Furthermore, the convex lenses G2 and G5 are composed of lanthanum-based heavy flint material, thereby allowing, in particular, chromatic aberration of magnification to be appropriately corrected over a wide visible-light band.

The second lens unit II has the functions of providing a reduction magnification to an image formed by the first lens unit I to obtain a desired focal length and arranging an image of the aperture stop ST at an apparently distant position relative to the reducing side of the projection lens P.

With the reduction of the optical power of the first negative lens unit I and the reduction of the magnification acting in the second positive lens unit II, it becomes difficult to obtain the back focus. However, the back focus can be ensured by properly selecting the optical power arrangement and the position of the principal plane of the second positive lens unit II.

Further, the second positive lens unit II includes the aperture stop ST, the biconvex lens G6 in which both surfaces are convex surfaces, and the negative lenses G7 and G8 arranged in this order from the enlarging side. The negative lenses G7 and G8, which have strong negative optical powers, are arranged where a paraxial marginal ray height is reduced by the aperture stop ST and the biconvex lens G6, thereby reducing the Petzval sum.

The use of two negative lenses G7 and G8 according to this embodiment is disadvantageous in terms of correction of the Petzval sum, but is effective in reducing excessive correction of an of f-axial peripheral sagittal flare.

Furthermore, the second positive lens unit II contains the three convex lenses G9, G10, and G11 to gently bend an off-axial principal ray so that the ray is parallel with the optical axis, thereby reducing, in particular, incoming comma aberration, astigmatism, and distortion.

By thus arranging the first negative lens unit I with negative optical power on the enlarging side relative to the second positive lens unit II (a master section) with positive optical power, a projection lens with a wide angle and a large aperture can be realized and a long back focus, as compared with the focal length (e.g. about 1.2 times as large as the focal length), can be ensured. Thus, for example, in a projection type image display apparatus, if a color combining prism or the like is arranged between an image forming element such as a liquid crystal display element and a projection optical system, the color combining prism or the like can be arranged in a sufficiently large space.

The projection lens P in this embodiment satisfies the following condition:

$$0 \leq |f/t1| < 0.2 \tag{1}$$

where reference character t1 denotes a distance from the reducing-side conjugate plane to the pupil, and reference character f denotes the focal length of the entire system.

By satisfying Conditional Expression (1), a projection optical system (projection lens P) which exhibits adequate telecentric performance and which is bright (e.g. F number of about 1.5) enough to illuminate even the peripheral areas of a screen (projected image) is realized.

Conditional Expression (1) expresses a proper range of a reducing-side paraxial pupil position ($|f/t1|$). Deviating from this range in either direction increases the angle between the off-axial principal ray and the optical axis. Undesirably, this results in misalignment with the illuminating system, which illuminates the liquid crystal element, thereby making the luminance on the screen nonuniform and reducing illuminance of the peripheral areas on the screen.

Additionally preferably, the following condition is satisfied:

$$0.05 \leq |f/t1| < 0.15 \tag{1'}$$

Further, according to the present invention, when the focal length of the first negative lens unit I is defined as f1, the following relationship is preferably also satisfied:

$$2 < -f1/f < 30 \tag{2}$$

A rear focus method with few distance-based variations in aberration can be actualized by properly arranging the optical power according to Conditional Expression (2). This serves to provide a projection optical system which enables the length of the entire optical system to be maintained at a constant value in the range of the focus used and which helps reduce driving loads of an autofocus mechanism in the projection type image display apparatus, thereby achieving a high focus responsiveness.

In this regard, Conditional Expression (2) is used to determined the magnification or the like of the second positive lens unit II. When the lower limit value of this expression is exceeded, the distance by which the second positive lens unit II is moved for focusing is reduced. This allows distance-based variations in aberration to be advantageously dealt with. However, the first negative lens unit I with negative optical power has stronger optical power, and the second positive lens unit II is subjected to a larger magnification, resulting in an excessively long back focus. This leads to an unnecessarily large optical length or an increase of asymmetry of the optical power arrangement. Consequently, it becomes difficult to correct distortion and chromatic aberration of magnification, which are likely to occur in the first negative lens unit I.

Conversely, when the upper limit value of Conditional Expression (2) is exceeded, aberration can advantageously be corrected. However, it undesirably becomes difficult to ensure the back focus or the second positive lens unit II must be moved by a large amount, resulting in marked distance-based variations in aberration.

Furthermore, the following preferred condition is satisfied:

$$2<-f1/f<20 \tag{2'}$$

And, preferably, the second lens unit is composed of at least one positive lens, at least one negative lens, and at least two positive lenses in this order from the enlarging side.

The second positive lens unit II is the master section of a retrofocus type lens, and in particular operates as a focus unit according to this embodiment. Thus, to reduce distance-based variations in aberration, aberration must be sufficiently corrected in the master section. Further, for the second positive lens unit II, which has strong positive optical power, the Petzvar sum of the entire system must be designed to be small. Accordingly, the optical power of the master section is arranged according to a positive-negative-positive arrangement.

Furthermore, the optical power of the positive lens located closest to the reducing side tends to be increased in order to ensure the back focus. Accordingly, off-axial aberration can be prevented by constructing the second positive lens unit II using at least two positive lenses.

Further, when the second positive lens unit II is further divided into two units which are disposed to each other across the largest air gap in the second positive lens unit II, the optical powers of the enlarging (emitting) side lens unit (the lenses G6 and G7 in FIG. 1) and reducing (incident) side lens unit (the lenses G8 to G11 in FIG. 1) preferably satisfy the following relationship:

$$1.0<f2f/f2r<2.5 \tag{3}$$

where reference character f2f denotes the focal length of the emitting side lens unit and reference character f2r denotes the focal length of the incident side lens unit.

When the upper limit value of Conditional Expression (3) is exceeded, the back focus becomes unnecessarily long, or it becomes difficult to correct incoming comma aberration and distortion.

Conversely, when the lower limit value of Conditional Expression (3) is exceeded, it becomes difficult to ensure the back focus from the second positive lens unit II. Accordingly, the negative optical power of the first negative lens unit I is increased to ensure the back focus. Thus, as previously described, the asymmetry of the optical power arrangement undesirably increases, thereby making it difficult to correct comma aberration, distortion, or other aberrations, and also making the reducing-side pupil position excessively close.

More preferably, the following condition is satisfied:

$$1.2<f2f/f2r<2.25 \tag{3'}$$

Further, the use of at least one aspherical lens in the projection optical system (projection lens P) serves to correct asymmetry aberration specific to the retrofocus type optical system. To improve the correcting effect, for the first negative lens unit I, the enlarging side lens is constructed as an aspherical lens, and for the second positive lens unit II, the lens located closer to the reducing side is constructed as an aspherical lens.

The type of the aspherical lens is selected in the light of the desired resolution and aspherical accuracy of the lens system. The aspherical lens made of plastics is expected to be advantageous in terms of costs.

Further, color aberration, which may occur particularly in the master section, can be corrected by including at least one cemented lens (e.g. a cemented lens including a convex lens arranged closer to the liquid crystal display element) in the second positive lens unit II.

Table 1 shows a numerical example (Numerical Example 1) of this embodiment.

In Table 1, reference character Ri denotes a radius of curvature of the i-th lens surface (Si: in the drawing, only some of the lens surfaces are denoted by reference characters) from the screen side (enlarging side), reference character di denotes a distance between the i-th and i+1-th lens surfaces, reference character ni denotes a refractive index of glass constituting the i-th surface, and reference character vi denotes an Abbe number of the glass constituting the i-th lens.

TABLE 1

Data for Numerical Example 1
f: 21.3　　　FNO: 1.54　　　ω: 29.72

|  | r | d | n | v |
|---|---|---|---|---|
| S1 | 45.273 | 2.20 | 1.812 | 25.4 |
| S2 | 26.541 | 2.93 | | |
| S3 | 36.330 | 6.91 | 1.839 | 37.2 |
| S4 | 16212.030 | 0.58 | | |
| S5 | 41.354 | 1.55 | 1.605 | 60.6 |
| S6 | 14.567 | 7.79 | | |
| S7 | −31.099 | 1.20 | 1.489 | 70.2 |
| S8 | 29.545 | 3.45 | | |
| S9 | 63.761 | 7.86 | 1.839 | 37.2 |
| S10 | −46.435 | ( ) | | |
| S11 | 29.008 | 6.69 | 1.699 | 55.5 |
| S12 | −41.829 | 0.10 | | |
| S13 | 60.779 | 1.20 | 1.573 | 50.8 |
| S14 | 19.043 | 6.91 | | |
| S15 | −15.709 | 1.05 | 1.812 | 25.4 |
| S16 | 33.183 | 7.62 | 1.518 | 64.1 |
| S17 | −20.758 | 0.20 | | |
| S18 | −279.170 | 3.52 | 1.661 | 50.9 |
| S19 | −35.717 | 0.10 | | |
| S20 | 42.723 | 6.14 | 1.705 | 41.2 |
| S21 | −77.679 | ( ) | | |
| S22 | inf. | 25.61 | 1.518 | 64.1 |
| S23 | inf. | 0.09 | | |
| S24 | inf. | 0.23 | 1.763 | 55.0 |
| S25 | inf. | 0.09 | | |
| S26 | inf. | 0.50 | 1.542 | 65.0 |
| S27 | Inf. | 0.09 | | |
| S28 | inf. | 0.37 | 1.462 | 65.0 |
| S29 | inf. | | | |

TABLE 1-continued

Data for Numerical Example 1
f: 21.3    FNO: 1.54    ω: 29.72

| | r | d | n | ν |
|---|---|---|---|---|

Focusing at point of infinity d10 12.25
d21 3.69

The numerical values for Conditional Expressions (1) to (3) in this Numerical Example 1 are shown below.

$$f/t1 = -0.12 \quad (1)$$

$$-f1/f = 6.96 \quad (2)$$

$$f2f/f2r = 1.41 \quad (3)$$

Figure 5:
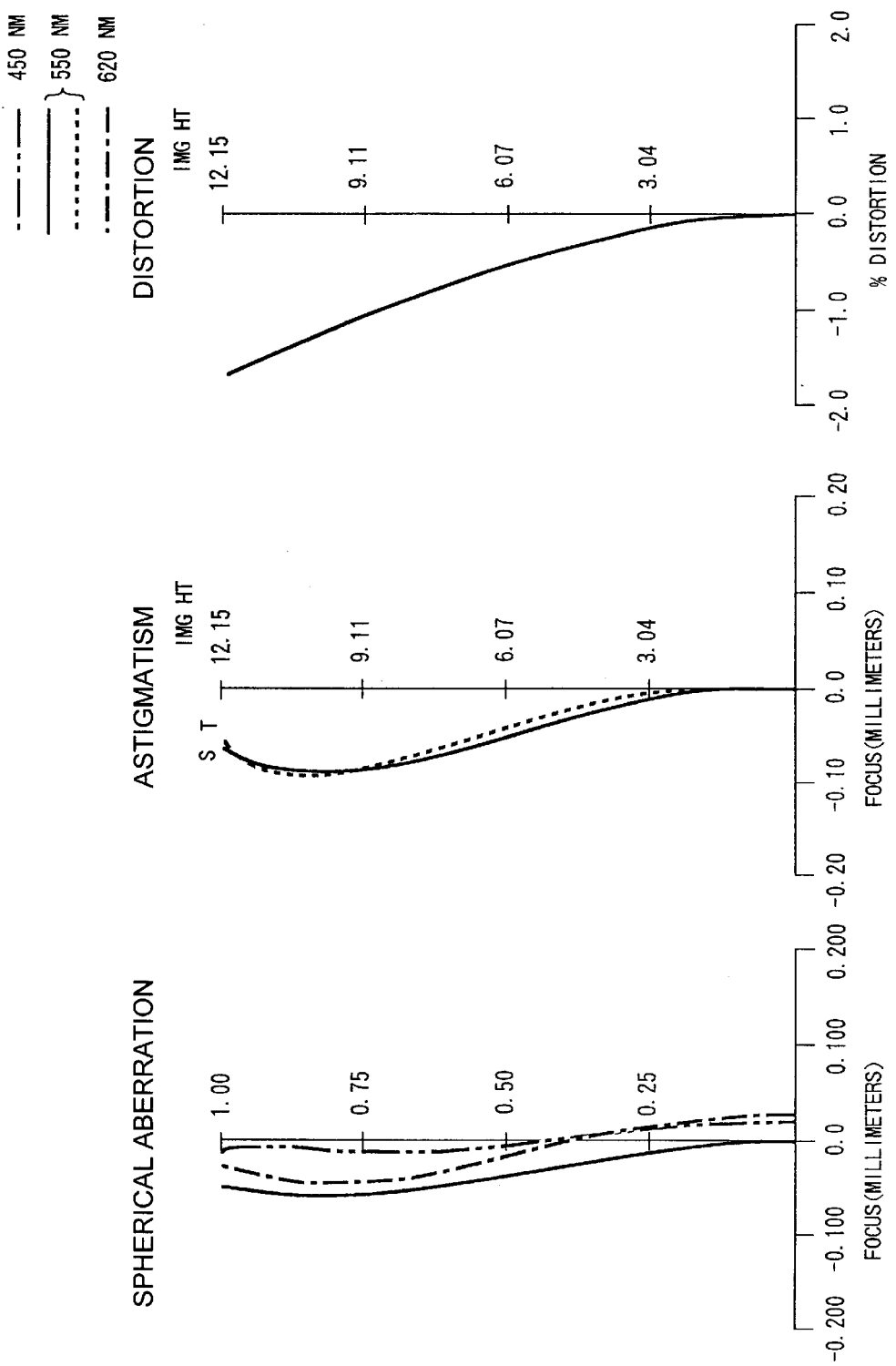
FIG. 5 is a diagram showing spherical aberration, astigmatism, and distortion occurring during 1.8-m focusing according to Embodiment 1.

Further, FIG. 5 shows aberrations occurring when the retrofocus type projection lens P of this Numerical Example 1 is in-focus at a distance of 1.8 m by using the second positive lens unit II.

(Embodiment 2)

Figure 2:
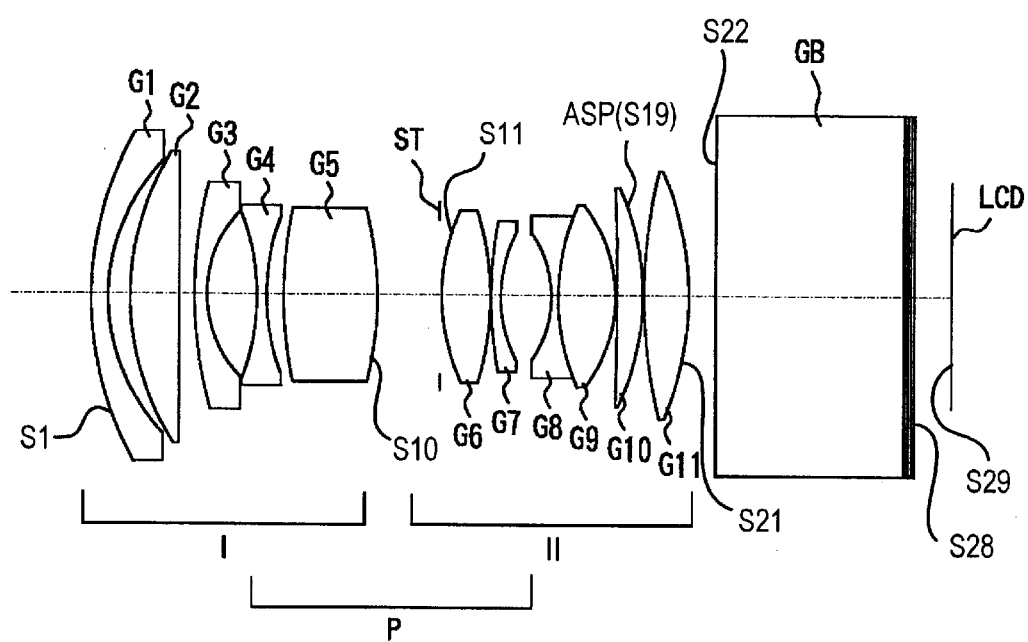
FIG. 2 is a sectional view of a projection type image display apparatus comprising a projection lens according to Embodiment 2 of the present invention.

FIG. 2 shows an optical configuration of a projection type image display apparatus according to Embodiment 2 of the present invention. The projection lens, P is composed of the first lens unit (hereinafter referred to as the "first negative lens unit") I having negative optical power and the second lens unit (hereinafter referred to as the "second positive lens unit") II having positive optical power, the first and second lens units being arranged in this order from the enlarging side (emitting side). The first negative lens unit I is composed of five lenses G1 to G5, while the second positive lens unit II is composed of six lenses G6 to G11.

Further, the second positive lens unit II is divided into two units, the enlarging side lens unit (G6 and G7) and the reducing side lens unit (G8 to G11) which are disposed to each other across the largest air gap in the second positive lens unit II.

In this embodiment, the lens G10 of the second positive lens unit II has an aspherical surface ASP on its reducing side (incident side). The aspherical lens serves to sufficiently correct distortion which is asymmetric aberration specific to the retrofocus type lens, as well as curvature of field.

Other components common to Embodiment 1 are denoted by the same reference characters as those of Embodiment 1. Description of these components is omitted.

Table 2 shows a numerical example (Numerical Example 2) of this embodiment. The numerical values in Table 2 have the same meanings as those in Numerical Example 1 of Embodiment 1.

Furthermore, the aspherical data complies with the following function:

$$Z = (y^2/r)/[1+\{1-(1+k)(y^2/r^2)\}^{1/2}] + Ay^4 + By^6 + Cy^8 + Dy^{10}$$

where reference character Z denotes a depth in the direction of the optical axis and reference character y denotes a height in the radial direction.

TABLE 2

Data for Numerical Example 2
f: 21.5    FNO: 1.54    ω: 29.51

| | r | d | n | ν |
|---|---|---|---|---|
| S1 | 46.638 | 2.20 | 1.812 | 25.4 |
| S2 | 26.646 | 2.92 | | |
| S3 | 38.834 | 6.05 | 1.839 | 37.2 |
| S4 | −1115.835 | 2.47 | | |
| S5 | 62.993 | 1.55 | 1.518 | 64.1 |
| S6 | 14.301 | 6.83 | | |
| S7 | −32.483 | 1.20 | 1.489 | 70.2 |
| S8 | 28.561 | 2.21 | | |
| S9 | 44.422 | 12.94 | 1.839 | 37.2 |
| S10 | −47.261 | ( ) | | |
| S11 | 28.938 | 6.03 | 1.699 | 55.5 |
| S12 | −40.300 | 0.10 | | |
| S13 | 305.787 | 1.20 | 1.624 | 36.3 |
| S14 | 21.610 | 7.21 | | |
| S15 | −15.350 | 1.05 | 1.768 | 26.5 |
| S16 | 39.210 | 6.98 | 1.605 | 60.6 |
| S17 | −25.194 | 0.20 | | |
| S18 | −1602.563 | 3.40 | 1.527 | 56.3 |
| S19 | ( ) | 0.10 | | |
| S20 | 56.824 | 6.30 | 1.705 | 41.2 |
| S21 | −44.379 | ( ) | | |
| S22 | inf. | 25.61 | 1.518 | 64.1 |
| S23 | inf. | 0.09 | | |
| S24 | inf. | 0.23 | 1.763 | 55.0 |
| S25 | inf. | 0.09 | | |
| S26 | inf. | 0.50 | 1.542 | 65.0 |
| S27 | inf. | 0.09 | | |
| S28 | inf. | 0.37 | 1.462 | 65.0 |
| S29 | inf. | | | |

Focusing at point of infinity d10 9.30
d21 3.84

TABLE 2-continued

Data for Numerical Example 2
f: 21.5  FNO: 1.54  ω: 29.51

Aspherical data

| | c(1/r) | k | A | B | C | D | E |
|---|---|---|---|---|---|---|---|
| S19 | −2.850e − 02 | −1.249e + 00 | 4.418e − 06 | 2.447e − 08 | −7.001e − 11 | 2.413e − 13 | 0.000e + 00 |

The numerical values for Conditional Expressions (1) to (3) in this Numerical Example 2 are shown below.

$$f/t1 = -0.11 \quad (1)$$

$$-f1/f = 14.45 \quad (2)$$

$$f2f/f2r = 1.96 \quad (3)$$

Figure 6:
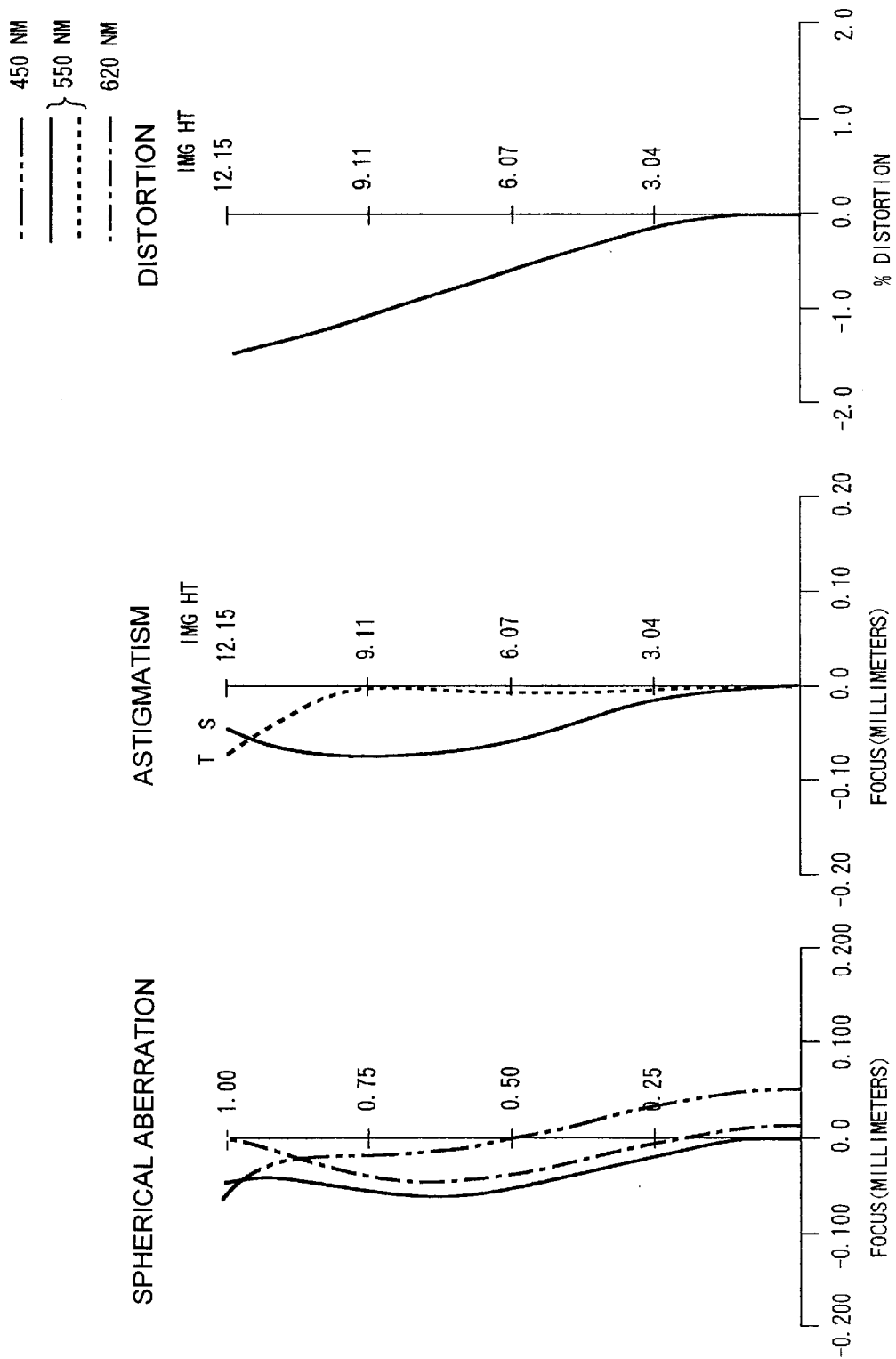
FIG. 6 is a diagram showing spherical aberration, astigmatism, and distortion during 1.8-m focusing according to Embodiment 2.

Further, FIG. 6 shows aberrations occurring when the retrofocus type projection lens P of this numerical example is in-focus at a distance of 1.8 m by using the second positive lens unit II.

(Embodiment 3)

Figure 3:
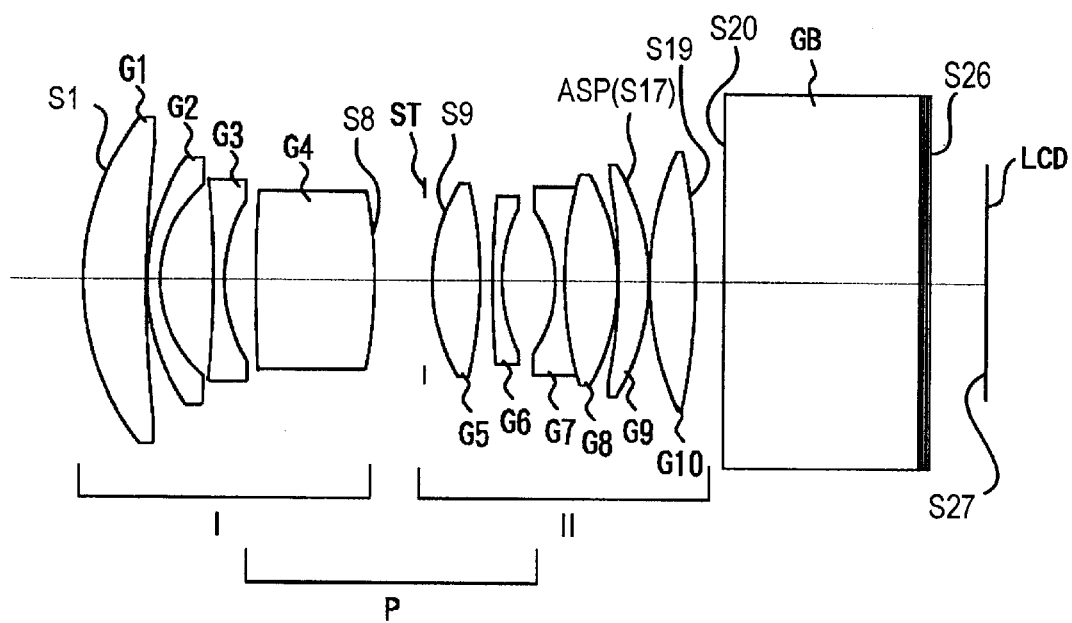
FIG. 3 is a sectional view of a projection type image display apparatus comprising a projection lens according to Embodiment 3 of the present invention.

FIG. 3 shows an optical configuration of a projection type image display apparatus according to Embodiment 3 of the present invention.

The projection lens P is composed of the first lens unit (hereinafter referred to as the "first negative lens unit") I having negative optical power and the second lens unit (hereinafter referred to as the "second positive lens unit") II having positive optical power, the first negative and second positive lens units I and II being arranged in this order from the enlarging side (emitting side). The first negative lens unit I is composed of four lenses G1 to G4, while the second positive lens unit II is composed of six lenses G5 to G10. The focus is adjusted by moving the second positive lens unit II in the direction of the optical axis.

Further, the second positive lens unit II divided into two units, the enlarging (emitting) side lens unit (G5 and G6) and the reducing (incident) side lens unit (G7 to G10) which are disposed to each other across the largest air gap in the second positive lens unit II.

In this embodiment, the convex lens G1 of the first negative lens unit I is arranged closest to the enlarging side, thereby hindering distortion while realizing a wide-angle lens having a projection ratio of 1.5:1.

Further, the first negative lens unit includes the two concave lenses G2 and G3 to gently bend off-axial rays, thereby preventing off-axial aberration. Furthermore, the convex lens G4 is composed of lanthanum-based heavy flint material, thereby allowing, in particular, chromatic aberration of magnification to be sufficiently corrected over a wide visible-light band.

In this embodiment, the lens G9 of the second positive lens unit II has an aspherical surface on its reducing side. The aspherical lens serves to sufficiently correct distortion which is asymmetric aberration specific to the retrofocus type lens, as well as surface curvature of field.

Other components common to Embodiment 1 are denoted by the same reference characters as those of the Embodiment 1. Description of these components is omitted.

Table 3 shows a numerical example (Numerical Example 3) of this embodiment. The numerical values in Table 3 have the same meanings as those in Numerical Example 1 of Embodiment 1.

Further, the aspherical data complies with the same function as that described in Embodiment 2.

TABLE 3

Data for Numerical Example 3
f: 26.9  FNO: 1.54  ω: 24.29

| | r | d | n | ν |
|---|---|---|---|---|
| S1 | 35.000 | 7.98 | 1.699 | 55.5 |
| S2 | 146.613 | 0.15 | | |
| S3 | 28.222 | 1.55 | 1.489 | 70.2 |
| S4 | 16.137 | 7.26 | | |
| S5 | −83.696 | 1.20 | 1.610 | 56.8 |
| S6 | 19.750 | 4.39 | | |
| S7 | 350.088 | 15.38 | 1.839 | 37.2 |
| S8 | −60.896 | ( ) | | |
| S9 | 25.276 | 6.15 | 1.699 | 55.5 |
| S10 | −56.321 | 1.76 | | |
| S11 | 185.058 | 1.20 | 1.677 | 32.1 |
| S12 | 21.683 | 7.11 | | |
| S13 | −16.112 | 1.05 | 1.694 | 31.1 |
| S14 | 54.741 | 6.81 | 1.615 | 58.7 |
| S15 | −27.483 | 0.10 | | |
| S16 | −73.091 | 3.93 | 1.527 | 56.3 |
| S17 | ( ) | 0.10 | | |
| S18 | 41.462 | 6.30 | 1.661 | 50.9 |
| S19 | −72.280 | ( ) | | |
| S20 | inf. | 25.61 | 1.518 | 64.1 |
| S21 | inf. | 0.09 | | |

TABLE 3-continued

Data for Numerical Example 3
f: 26.9    FNO: 1.54    ω: 24.29

| | | | | |
|---|---|---|---|---|
| S22 | inf. | 0.23 | 1.763 | 55.0 |
| S23 | inf. | 0.09 | | |
| S24 | inf. | 0.50 | 1.542 | 65.0 |
| S25 | inf. | 0.09 | | |
| S26 | inf. | 0.37 | 1.462 | 65.0 |
| S27 | inf. | | | |

Focusing at point of infinity d8 7.91
d19 2.89

Aspherical data

| | c(1/r) | k | A | B | C | D | E |
|---|---|---|---|---|---|---|---|
| S17 | −3.985e − 02 | −4.592e − 01 | 3.775e − 06 | 2.799e − 08 | −9.221e − 11 | 4.848e − 13 | 0.000e + 00 |

The numerical values for Conditional Expressions (1) to (3) in this embodiment (Numerical Example 3) are shown below.

$f/t1 = -0.12$ (1)

$-f1/f = 4.27$ (2)

$f2f/f2r = 1.92$ (3)

Figure 7:
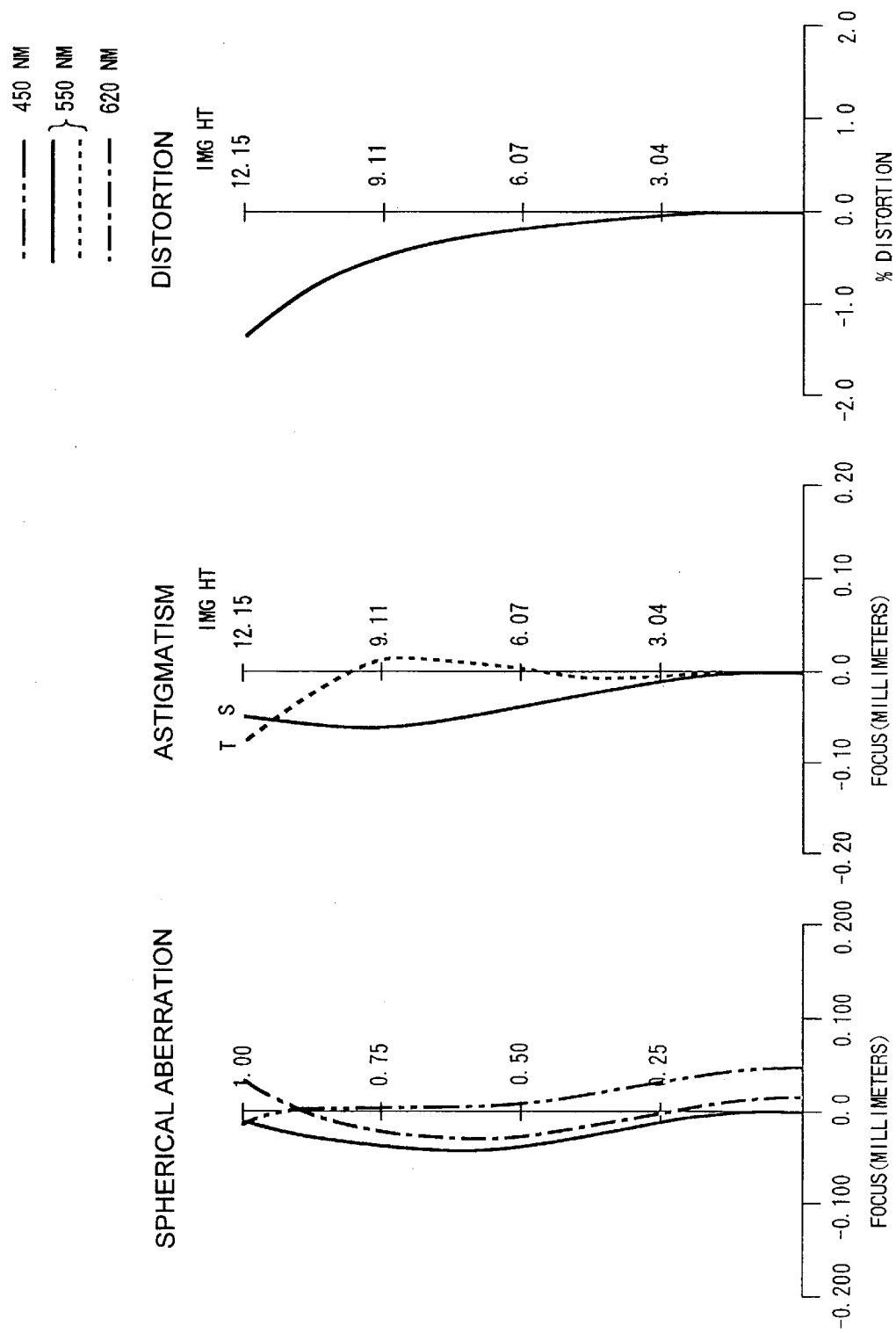
FIG. 7 is a diagram showing spherical aberration, astigmatism, and distortion occurring during 1.8-m focusing according to Embodiment 3.

Further, FIG. 7 shows aberrations occurring when the retrofocus type projection lens P of this embodiment (Numerical Example 3) is in-focus at a distance of 1.8 m using the second positive lens unit II.

(Embodiment 4)

Figure 4:
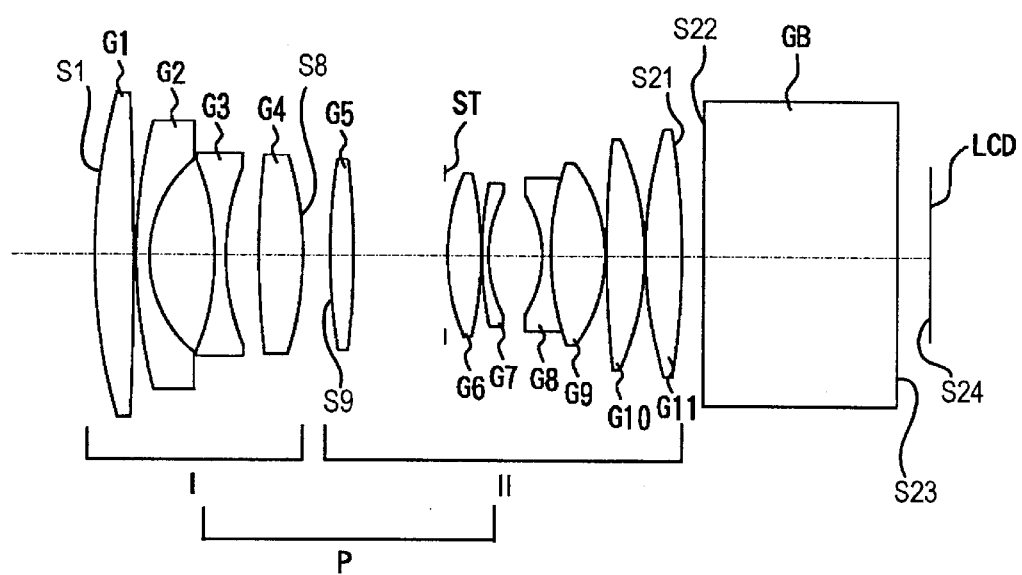
FIG. 4 is a sectional view of a projection type image display apparatus comprising a projection lens according to Embodiment 4 of the present invention.

FIG. 4 shows an optical configuration of a projection type image display apparatus according to Embodiment 4 of the present invention.

The projection lens P is composed of the first lens unit (hereinafter referred to as the "first negative lens unit") I having negative optical power and the second lens unit (hereinafter referred to as the "second positive lens unit") II having positive optical power, the first and second lens units being arranged in this order from the enlarging side (emitting side). The first negative lens unit I is composed of four lenses G1 to G4, while the second positive lens unit II is composed of seven lenses G5 to G11.

Further, the second positive lens unit II is divided into two units, the enlarging (emitting) side lens unit (G6 and G7) and the reducing (incident) side lens unit (G8 to G11) which are disposed to each other across the largest air gap in the second positive lens unit II.

In this embodiment, the convex lens of the first negative lens unit I is arranged closest to the enlarging side, thereby hindering distortion while realizing a wide-angle lens having a projection ratio of 1.5:1.

Further, the first negative lens unit I includes the two concave lenses G2 and G3 to gently bend off-axial rays, thereby preventing off-axis aberration. Furthermore, the convex lens G4 is composed of lanthanum-based heavy flint material, thereby allowing, in particular, chromatic aberration of magnification to be sufficiently corrected over a wide visible-light band.

In this embodiment, the first negative lens unit I has stronger optical power than those in the other embodiments. Further, on the basis of the tendency of the magnification acting in the second positive lens unit II to increase, the refractive index is, advantageously arranged so as to ensure the back focus.

Further, the second positive lens unit II includes the biconvex lens G5 in which both surfaces are convex surfaces, the diaphragm ST, the biconvex lens G6 in which both surfaces and the negative lenses G7 and G8 are convex surfaces, arranged in this order from the enlarging side. The negative lenses G7 and G8, which have strong negative optical powers, are arranged where a paraxial marginal ray height h is reduced, thereby reducing the Petzval sum.

The use of the two negative lenses G6 and G7 according to this embodiment is disadvantageous in terms of correction of the Petzval sum, but is effective in reducing excessive correction of an off-axial peripheral sagittal flare.

Furthermore, the three convex lenses G9, G10, and G11 are used to gently bend an off-axial principal ray so that the ray is parallel with the optical axis, thereby reducing, in particular, incoming comma aberration, astigmatism, and distortion.

Other components common to Embodiment 1 are denoted by the same reference characters as those of Embodiment 1. Description of these components is omitted.

Table 4 shows a numerical example (Numerical Example 4) of this embodiment. The numerical values in Table 4 have the same meanings as those in Numerical Example 1 of Embodiment 1.

TABLE 4

Data for Numerical Example 4
f: 21.9    FNO: 1.54    ω: 29.03

| | r | d | n | ν |
|---|---|---|---|---|
| S1 | 85.920 | 5.37 | 1.699 | 55.5 |
| S2 | −424.787 | 0.30 | | |
| S3 | 74.310 | 1.70 | 1.489 | 70.2 |
| S4 | 17.132 | 9.55 | | |
| S5 | −33.976 | 1.25 | 1.574 | 53.0 |
| S6 | 33.018 | 4.86 | | |
| S7 | 152.349 | 6.08 | 1.839 | 37.2 |
| S8 | −48.861 | ( ) | | |
| S9 | 80.815 | 3.22 | 1.839 | 37.2 |
| S10 | −127.457 | 13.24 | | |
| S11 | 30.306 | 4.65 | 1.699 | 55.5 |
| S12 | −52.536 | 0.15 | | |
| S13 | 54.818 | 0.85 | 1.768 | 26.5 |
| S14 | 18.170 | 7.64 | | |
| S15 | −14.986 | 1.10 | 1.854 | 23.9 |
| S16 | 39.555 | 7.65 | 1.591 | 61.1 |
| S17 | −22.056 | 0.26 | | |
| S18 | 199.557 | 5.19 | 1.696 | 53.2 |

TABLE 4-continued

Data for Numerical Example 4
f: 21.9     FNO: 1.54     ω: 29.03

| | r | d | n | ν |
|---|---|---|---|---|
| S19 | −38.866 | 0.10 | | |
| S20 | 59.738 | 4.99 | 1.854 | 23.9 |
| S21 | −117.392 | ( ) | | |
| S22 | inf. | 26.32 | 1.518 | 64.1 |
| S23 | inf. | 4.76 | | |
| S24 | inf. | | | |

Focusing at point of infinity d8 4.33
d21 3.14

The numerical values for Conditional Expressions (1) to (3) in this embodiment (Numerical Example 4) are shown below.

$$f/t1 = -0.11 \quad (1)$$

$$-f1/f = 2.92 \quad (2)$$

$$f2f/f2r = 1.90 \quad (3)$$

Figure 8:
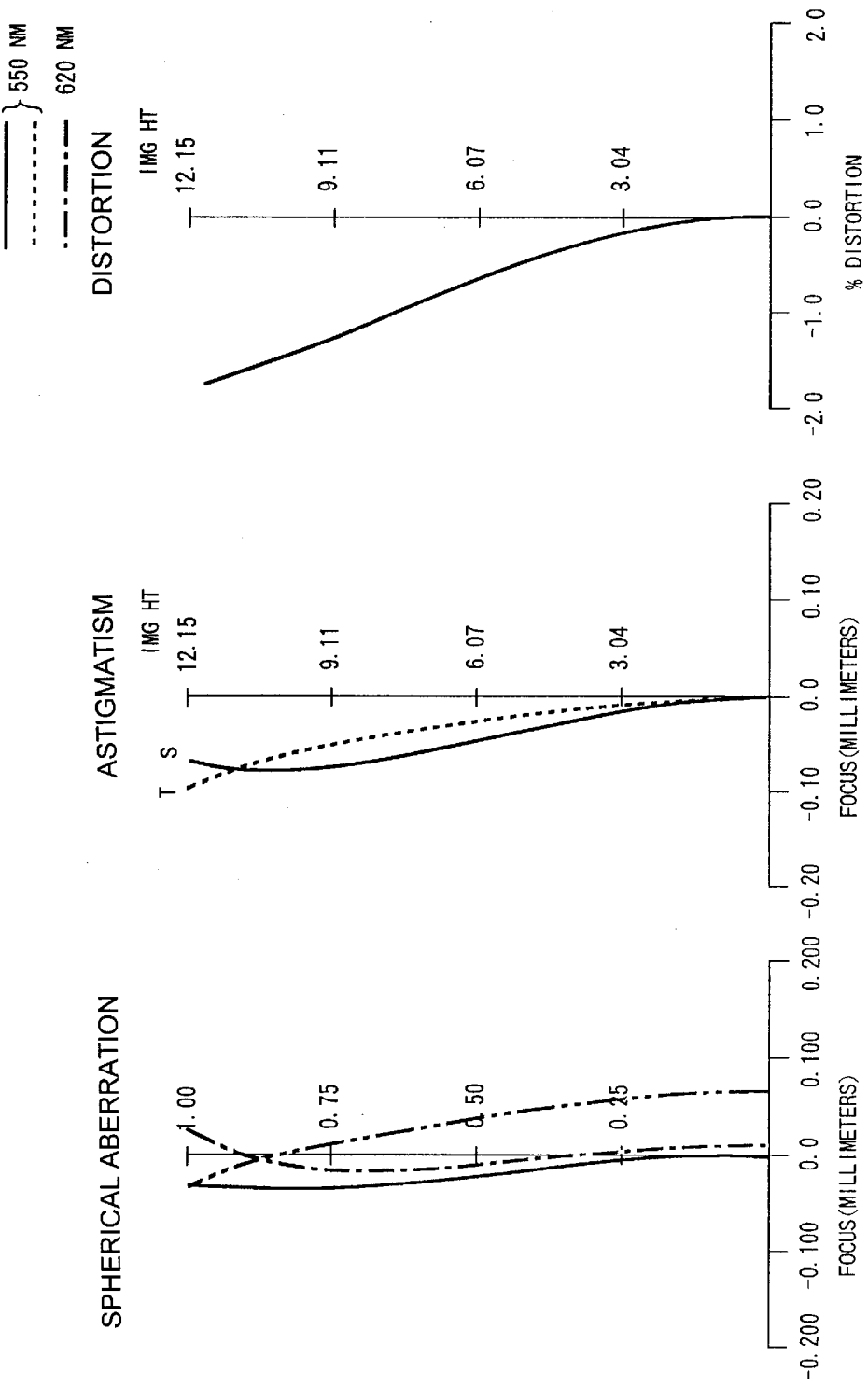
FIG. 8 is a diagram showing spherical aberration, astigmatism, and distortion occurring during 1.8-m focusing according to Embodiment 4.

Further, FIG. 8 shows aberrations occurring when the retrofocus type projection lens P of this Numerical Embodiment 4 is in-focus at a distance of 1.8 m by using the second positive lens unit II.

The projection type image display apparatuses of the above-described embodiments are also applicable to an image projection system that drives an image display element on the basis of image information supplied by an image information supply apparatus (a personal computer, a television, a VCR, a DVD player, any tuner for satellite broadcasting or cable TV, a camera, a video camera, etc.) (not shown) to display or project images.

Moreover, the projection type image display apparatuses of the above-described embodiments may be adapted to receive image information without any image information supply apparatuses by including a circuit that reads image information from a storage medium such as a DVD, a CD, or a VCR that stores the image information, receiving satellite or ground-wave TV broadcasting or the like through an antenna or the like, receiving cable TV, Internet TV, or the like, or receiving image information via the Internet.

Specifically, the projection type image display apparatus may include an antenna, a cable receptacle for cable TV or for an Internet cable, or the like through which image information is received for projection.

In this manner, a system can be constructed in which the projection type display apparatus of the present invention receives image information from various image supply means and projects the corresponding image on a projection surface.

As described above, according to the above-described embodiments, the first lens unit having negative optical power is arranged on the enlarging side relative to the second lens unit having positive optical power and acting as a master section. This serves to increase the angle covered by the lens as well as the aperture thereof and to ensure a long back focus as compared with the focal length. Thus, for example, in a projection type image display apparatus, if a color combining prism or the like is arranged between an image display element such as a liquid crystal display element and a projection optical system, it can be arranged in a sufficiently large space.

Further, by satisfying Conditional Expression (1), a projection optical system which exhibits adequate telecentric performance and which is bright enough to illuminate even the peripheral areas of the projected image is realized.

Furthermore, a rear focus method with few distance-based variations in aberration can be actualized by properly arranging the optical power according to Conditional Expression (2). This serves to provide a projection optical system which enables the length of the entire optical system to be maintained at a constant value in the range of the focus used and which helps reduce driving loads of an autofocus mechanism in the projection type image display apparatus, thereby achieving high focus responsiveness.

Moreover, when the second lens unit is composed of at least one positive lens, at least one negative lens, and at least two positive lenses, the positive and negative lenses being arranged in this order from the enlarging side, then aberration can be sufficiently corrected within the second lens unit, which constitutes both master section and focus unit of a retrofocus type lens. Further, the Petzvar sum of the entire system can be reduced by arranging the optical of the master section according to a positive-negative-positive arrangement.

Furthermore, the optical power of the positive lens located closest to the reducing side tends to be increased in order to ensure the back focus. Accordingly, off-axial aberration can be prevented by constructing the second lens unit using at least two positive lenses.

Moreover, in connection with the optical power arrangement of the second lens unit, when the second lens unit is further divided into two units in which are disposed to each other across the largest air gap in the second lens unit, the optical powers of the enlarging and reducing side lens units satisfy Conditional Expression (3), described above. This prevents an unnecessarily long back focus and allows incoming comma aberration and distortion to be corrected easily. It also eliminates the need for an increase in the negative optical power of the first lens unit, which in turn increases the asymmetry of the optical power arrangement, thereby making it difficult to correct comma aberration, distortion, or other aberrations and making a reducing-side pupil position excessively close.

Further, the use of at least one aspherical lens in the projection optical system serves to correct asymmetry aberration specific to retrofocus type optical system. The correcting effect can be improved by constructing, for the first lens unit, the enlarging side lens as an aspherical lens and for the second lens unit, the lens located closer to the reducing side as an aspherical lens.

Furthermore, chromatic aberration, which may occur particularly in the master section, can be corrected by including at least one cemented lens in the second lens unit.

While preferred embodiments have been described, it is to be understood that modification and variation of the present invention may be made without departing from the sprit or scope of the following claims.

What is claimed is:

1. A projection optical system that enlarges and projects an image, comprising in order from the enlarging side:

a first lens unit having negative optical power; and a second lens unit having positive optical power, said second lens unit moves in a direction of an optical axis for focusing, and the following conditions is satisfied:

$$0 \leq |f/t1| < 0.2$$

where reference character t1 denotes a distance from a reducing-side conjugate plane to a pupil and reference character f denotes a focal length of the entire system.

2. The projection optical system according to claim 1, wherein the following condition is further satisfied:

$$0.05 \leq |f/t1| < 0.15.$$

3. The projection optical system according to claim 1, wherein the following condition is further satisfied:

$$2 < -f1/f < 30$$

where reference character f1 denotes a focal length of said first lens unit.

4. The projection optical system according to claim 1, wherein the following condition is further satisfied:

$$2 < -f1/f < 20$$

where reference character f1 denotes a focal length of said first lens unit.

5. The projection optical system according to claim 1, wherein said second lens unit comprises of at least one positive lens, at least one negative lens, and at least two positive lenses in order from the enlarging side.

6. The projection optical system according to claim 1, wherein when said second lens unit is divided into two units which are disposed to each other across the largest air gap in said second lens unit, an emitting side lens unit and an incident side lens unit of said two units satisfy the following condition:

$$1.0 < f2f/f2r < 2.5$$

where reference character f2f denotes a focal length of said emitting side lens unit, and reference character f2r denotes a focal length of said incident side lens unit.

7. The projection optical system according to claim 1, wherein when said second lens unit is divided into two units which are disposed to each other across the largest air gap in said second lens unit, an emitting lens unit and an incident side lens unit of said two units satisfy the following condition:

$$1.2 < f2f/f2r < 2.25$$

where reference character f2f denotes a focal length of said emitting side lens unit, and reference character f2r denotes a focal length of said incident lens unit.

8. The projection optical system according to claim 1, further comprising of at least one aspherical lens.

9. The projection optical system according to claim 8, wherein said aspherical lens is made of plastics.

10. The projection optical system according to claim 1, wherein said second lens unit includes at least one cemented lens.

11. A projection type image display apparatus comprising:
a plurality of image forming elements which emit image lights of a plurality of colors;
a color combining optical system that combines the image lights of a plurality of colors emitted by said plurality of image forming elements; and
a projection optical system which enlarges the image light combined by said color combining optical system and projects the image light on a projection surface,
wherein said projection optical system comprises in order from an enlarging side:
a first lens unit having negative optical power; and
a second lens unit having positive optical power, said second lens unit moves in a direction of an optical axis for focusing, and
the following conditions is satisfied:

$$0 \leq |f/t1| < 0.2$$

where reference character t1 denotes a distance from a reducing-side conjugate plane to a pupil and reference character f denotes a focal length of the entire system.

12. The projection type image display apparatus according to claim 11, wherein said image forming elements are liquid crystal elements, and the apparatus further comprises an illuminating system which illuminates said image forming elements.

13. An image projection system comprising:
1) a projection type image display apparatus which comprises:
a plurality of image forming elements which emit image lights of a plurality of colors;
a color combining optical system which combines the image lights of a plurality of colors emitted by said plurality of image forming elements; and
a projection optical system which enlarges the image light combined by said color combining optical system and projects the image light on a projection surface,
wherein said projection optical system includes in order from the enlarging side:
a first lens unit having negative optical power; and
a second lens unit having positive optical power, said second lens unit moves in a direction of an optical axis for focusing and
the following conditions is satisfied:

$$0 \leq |f/t1| < 0.2$$

where reference character t1 denotes a distance from a reducing-side conjugate plane to a pupil and reference character f denotes a focal length of the entire system,
2) an image information supply apparatus which supplies said projection type image display apparatus with image information used to drive said plurality of image forming elements.

* * * * *